United States Patent [19]

Hosokawa et al.

[11] Patent Number: 5,283,215
[45] Date of Patent: Feb. 1, 1994

[54] REFRACTORIES FOR CASTING PROCESS

[75] Inventors: Kiyoshiro Hosokawa; Hitoshi Nishiwaki; Kouichi Nishi, all of Hyogo; Seiji Hanagiri, Oita; Shiro Sukenari, Oita; Takenori Nakamichi, Oita; Naoki Tsutsui, Aichi; Tsuyoshi Matsuda, Aichi; Kouzou Akao, Aichi, all of Japan

[73] Assignees: Ceramic Co., Ltd. Harima, Hyogo; Nippon Steel Corporation, Tokyo, both of Japan

[21] Appl. No.: 977,247

[22] Filed: Nov. 16, 1992

[30] Foreign Application Priority Data

Nov. 26, 1991 [JP] Japan .................. 3-335452
Nov. 26, 1991 [JP] Japan .................. 3-335453
Apr. 28, 1992 [JP] Japan .................. 4-134481
Jul. 23, 1992 [JP] Japan .................. 4-216559

[51] Int. Cl.$^5$ ............. C04B 35/04; C04B 35/44
[52] U.S. Cl. .................. 501/120; 501/109; 501/121
[58] Field of Search .......... 501/120, 121, 109

[56] References Cited

FOREIGN PATENT DOCUMENTS 60-60985 4/1985 Japan .
63-218586 9/1988 Japan .
64-87577 3/1989 Japan .

*Primary Examiner*—Mark L. Bell
*Assistant Examiner*—David Sample
*Attorney, Agent, or Firm*—Wenderoth, Lind & Ponack

[57] ABSTRACT

The present invention relates to a refractory for casting process composed mainly of 0.3 to 10 wt % light burned magnesia, 3 to 30 wt % micro fine calcined alumina, and the remainder of either sintered alumina, fused alumina and MgO-$Al_2O_3$ spinel or sintered alumina and MgO-$Al_2O_3$ spinel or fused alumina and MgO-$Al_2O_3$ spinel.

5 Claims, No Drawings

REFRACTORIES FOR CASTING PROCESS

BACKGROUND OF THE INVENTION

The present invention relates to refractories for casting process which are highly erosion resistant, especially to slag with a high FeO content. These refractories for casting process are effective for the lining of RH type, DH type and other vacuum degassing furnaces where slag with a high FeO content exists, and can also be used as refractories for converters, ladles, torpedo cars, gas blowing lances, etc.

RH type, DH type and other vacuum degassing furnaces are known as molten steel processors. Magnesia-chromite direct bonded bricks have principally been used as lining materials for such vacuum degassing furnaces to date, however, the inherent problems are that burning the brick requires considerable energy and that the construction of the furnaces requires special skill and is very labor-intensive.

In addition, due to the chrome content of magnesia-chromite direct bonded bricks, a problem concerning environmental protection exists as to suitable brick disposal methods after use. Lining vacuum degassing furnaces with monolithic refractories overcomes the high labor and environmental costs otherwise generated in operating such furnaces.

In the operation of vacuum degassing furnaces, however, molten steel and slag are vigorously stirred inside, causing considerable wear of the lining materials. Bricks other than the direct bonded magnesia-chromite types are of insufficient durability and monolithic refractories are far less durable.

Refractories for casting process containing alumina-spinel have been proposed as monolithic refractories for the lining of molten steel vessels. For example, Japanese Provisional Patent publication No. 50-60985 discloses a material containing at least 60 wt % spinel, 10 to 35 wt % alumina and 3 to 10 wt % alumina cement. Japanese Provisional Patent Publication No. 1-87577 discloses another material composed of 50 to 90 wt % alumina, 10 to 40 wt % spinel and 3 to 25 wt % alumina cement. Also, Japanese Provisional patent No. 53-218585 discloses a refractory for casting process having fine magnesia and ultra-fine alumina powder arranged in the matrix section of an alumina material.

These refractories for casting process are highly durable due to the synergistic effect of the erosion resistance of alumina and the slag penetration-proof property of spinel and cause no pollution problem because they contain no chrome.

However, these conventional alumina-spinel or alumina-magnesia refractories for casting process are used only for the lining of molten steel ladles or blast furnace troughs, and are not sufficiently durable for the severe working conditions of vacuum degassing furnaces and, as a result, have not been put to practical use for such a purpose.

In the case of vacuum degassing furnaces, slag has a high FeO content as compared with other molten steel vessels. In conventional refractories for casting process which use alumina cement as the binder, $Al_2O_3$ from aggregates and CaO from cement react with FeO present in the slag and produce substances of low-melting point such as $Al_2O_3$-FeO or $Al_2O_3$-FeO-CaO. In the case of vacuum degassing furnaces, one of the major causes of lower lining erosion resistance is that slag has a high FeO content which causes substances of low-melting point to be produced.

SUMMARY OF THE INVENTION

The present invention provides refractories for casting process which have high spalling resistance high erosion resistance even to slag with a high FeO content and can make monolithic refractories suitable as lining materials for vacuum degassing furnaces.

As a result of repeated studies towards improving the performance of a conventional alumina-spinel refractory for casting process, these inventors found that the refractory became more durable than magnesia-chromite direct bonded bricks when light burned magnesia and micro fine calcined alumina are added at a specific rate, and were thus able to successfully complete the present invention.

In other words, the present invention is a refractory for casting process which is composed mainly of 0.3 to 10 wt % light burned magnesia, 3 to 30 wt % micro fine calcined alumina and the remainder of either sintered alumina, fused alumina and $MgO\text{-}Al_2O_3$ spinel or sintered alumina and $MgO\text{-}Al_2O_3$ spinel or fused alumina and $MgO\text{-}Al_2O_3$ spinel.

DESCRIPTION OF THE PREFERRED EMBODIMENTS

Alumina cement has generally been used as a binder for refractories for casting process to date, but in the present invention, finely-powdered light burned magnesia is used as the binder. Light burned magnesia is produced by burning magnesium hydroxide at temperatures from 800° to 1300° C. causing fine crystals to be coagulated as fine powder.

When the refractory for casting process is used for casting or is dried, the light burned magnesia reacts with water and turns into magnesium hydroxide, which promotes hardening of the object to be constructed, by functioning as a binder. The magnesium hydroxide is then heated and dehydrated into fine magnesia when the constructed object is used. In the case of the material of the present invention, the fine magnesia produced from this magnesium hydroxide reacts with micro fine calcined alumina to produce $MgO\text{-}Al_2O_3$ spinel at the coupled section of the refractory texture.

The spinel is highly heat resistant and also erosion resistant to slag with a high FeO content. The spinel, which is produced at the coupled section according to the present invention, is very fine and is of high dispersibility in the coupled texture. As a result, it has a remarkable effect on the prevention of molten steel and slag penetration and on the improvement of erosion resistance.

In the case of the alumina-spinel monolithic refractory disclosed in Japanese Provisional Patent Publication No 60-60985, for example, alumina cement is used as the binder, and no light burned magnesia is added, thus preventing the formation of fine spinel at the coupled section. In addition, the CaO present in the alumina cement lowers the refractory's erosion resistance.

Japanese Provisional Patent Publication No. 53-218586 discloses a monolithic alumina refractory on the matrix of which fine magnesia powder and ultra-fine alumina powder are arranged. However, according to this Publication, fused magnesia of low hydration activity is preferable for the fine magnesia powder and sintered magnesia can also be used. Active materials such as light burned magnesia are not used.

The fused or sintered magnesia differs from the light burned magnesia to be used in the present invention, in that fused or sintered magnesia does not hydrate with water used for casting process and naturally reacts with alumina. The temperature required to generate spinel according to the normal reaction of magnesia with alumina is about 1,100° C. On the other hand, if the light burned magnesia reacts with the micro fine calcined alumina as fine magnesia after conversion to magnesium hydroxide, the required temperature for the generation of spinel is as low as 900° C. and perfectly-formed spinels are produced a the matrix portion.

Since the fused or sintered magnesia has large crystal grain diameter, its volume is greatly expanded after spinels are produced as a result of the reaction with alumina, and the textural strength of the refractory is reduced. After being converted to magnesium hydroxide, the light burned magnesia reacts with the micro fine calcined alumina in the fine magnesia state, and the cubic expansion after spinels are produced is minimal.

The activity of the light burned magnesia influences the effectiveness of refractories for casting process as regards hardening time, strength after curing, strength after drying, etc. In the case of the refractory of the present invention, it is desirable from the viewpoint of effectiveness to use a light burned magnesia which is sufficiently active to achieve an iodine absorption of from 1 to 50 mg/g. Iodine absorption is a method whereby the specific granular surface area can be measured, wherein the larger the iodine absorption, the more active the grain.

If the refractory of the present invention contains less than 0.3 wt % of light burned magnesia, there is insufficient spinel production at the coupled section and the expected effect cannot be obtained. If it contains more than 10 wt % of the same, the refractory texture becomes fragile and less erosion resistant because the volume expands when spinels are produced.

Micro fine calcined alumina consists of fine corundum crystals and is thermally reactive because of its large surface area and crystalline fineness. To produce this ultra-fine powder, aluminum hydroxide is first produced by the Bayer Process, burnt at a temperature of from 1000 to 1400° C. and crushed. Micro fine calcined alumina of average granular size of 8 μm or less, preferably from 3 to 0.5 μm, is used for the refractory of the present invention. It is also desirable for the purity of $Al_2O_3$ to be 99 wt % or higher.

If the refractory of the present invention contains no more than 5 wt % micro fine calcined alumina, spinel production at the coupled section is insufficient, and the expected effect cannot be obtained. If more than 30 wt % micro fine calcined alumina is contained, the object to be constructed is burnt excessively and its spalling resistance is deteriorated.

As for the aggregate, the same sintered alumina or fused alumina and $MgO-Al_2O_3$ spinel are used as for conventional refractories for casting process.

To produce sintered alumina, aluminum hydroxide is first produced by the Bayer Process, burnt at a temperature of from 1,000° to 1,400° C., mixed with binder, shaped and granulated, then burnt again, normally at a temperature above 1,700° C., and sintered.

Fused alumina is produced by fusing and solidifying aluminum hydroxide produced by the Bayer Process. Another method is to add coke, iron, etc. to the base material of natural high alumina such as aluminous shale, then subjecting it to fuse-reduction.

Spinel, as aggregate, is erosion resistant to slag with a high FeO content and is slag penetration-proof. Either sintered or fused spinel may be used. It is desirable that spinel contain, 3 to 35 wt % MgO. Spinel and corundum may be used together.

To produce sintered spinel, calcined alumina produced by the Bayer Process and magnesia are mixed, shaped and sintered at a temperature of 1,500° C. or above. Fused spinel is produced by mixing calcined alumina produced by the Bayer Process and magnesia, then fusing and solidifying them in an electric furnace.

When alumina and spinel are used as aggregate, the granular sizes and percentages are same as those for conventional refractories for casting process. The granular size is classified as usual into coarse, medium and fine by taking into account fluidity at the time of casting process and the granular density of the object to be constructed. The maximum granular size is, in general, 3 to 5 mm. The granular size of alumina, as aggregate, may be as large as 30 to 5 mm.

Also, sintered magnesia, fused magnesia, glass powder, azodicarbonamide, 4.4-oxybisbenzensulfonylhydrazide, etc. may be added to the refractory for casting process of the present invention. Sintered or fused magnesia is effective in improving erosion resistance, but over-addition degrades the spalling resistance and slag penetration proofing.

Light burned magnesia reacts with water used for casting process and turns into magnesium hydroxide to work as a binder. If dried or heated during the actual use of the object and the magnesium hydroxide is decomposed, the strength of the object will deteriorate. If glass powder is also added to the invented refractory, the strength of the object can be improved at temperatures of from 400° to 1,000° C. because of its viscosity at the time of fusing, and strength reduction at the time of decomposition of the magnesium hydroxide can be prevented.

Concerning glass powder, one or two types are selected from boro-silicated glass, boric acid glass, silicated glass, phosphoric acid glass. etc., and their softening temperatures should preferably be below 1,000° C. The selected glass powder is added by less than 5 wt % of the total refractory to ensure, that erosion resistance is not degraded.

The refractory for casting process is dried after hardening of the object, but if dried rapidly by heating with a sharp temperature increase, dry bursting will occur due to steam generation from the water used for casting process. If azodicarbonamide. 4.4-oxybisbenzensulfonylhydrazide, etc. are added to the refractory of the present invention, pores will be formed in the object due to gas generation, said pores being effective in preventing dry bursting. Such additions are effective in promoting hydration of light burned magnesia and in improving the strength of the object. Adding one of such additives by 0.01 to 2 wt % of the total refractory is desirable. If more than 2 wt % is added, the object becomes porous and less erosion resistant.

In addition, zirconia powders, carbon powders, silica fume, fireproofing super-fine powders, metal powders and other various short fibers may be added to the refractory of the present invention as long as there is no adverse influence on the effect.

Also, in order to improve fluidity during the casting process, the usual dispersing agents and hardness adjusting agents may be added. One or two dispersing agents are selected from sodium tripolyphosphate, sodium hexametaphosphate, sodium polyacrylate, sodium ligninsulfonate, etc. and are added by 0.01 to 1.0 wt % of the total refractory. As the hardness adjusting agent, one or two agents are selected from boric acid, ammonium borate, sodium ultrapolyphosphate, lithium carbonate, etc. and are added by 0.01 to 1.0 wt % of the total refractory.

When casting, water is added by 4 to 8% of the total refractory to the above components through a molding flask. When casting, a vibrator is generally fitted to the molding flask or a bar-type vibrator is inserted into the refractory in order to improve filling ability.

The refractory for casting process of the present invention is effective for the lining of RH type, DH type and other vacuum degassing furnaces where slag with a high FeO content exists and can also be used as a refractory for converters, ladles, torpedo cars, gas blowing lances, etc.

Table 1 shows chemical analysis values of components used for the embodiment of the present invention and for reference examples. Tables 2, 3 and 4 show the embodiment and reference examples and their test results. In each example excluding magnesia-chromite direct bonded brick, a suitable amount of water was added during casting and refractories were cast into molding flasks using a vibrator. Testing was performed after drying for 24 hours at 200° C. The following testing methods were employed:

Modulus of rupture: measured after drying and after firing at 800° C.

Permanent linear change: measured in accordance with JIS R2553.

Spalling resistance: Specimens were heated in the atmosphere to 1500° C. for 20 minutes then allowed to cool in the air. This was repeated to count the number of cycles until peeling occurred.

Erosion resistance: Rotary erosion tests were conducted with an erosion agent composed of 80% steel and of 20% slag (with FeO content 20% by weight) by weight at 1,600° C. for three hours, and erosion depth was measured.

Slag penetration proofing: After the above rotary erosion test, slag penetration depth was measured.

Actual service test: Specimens were lined in the lower tank of a 350-ton RH type vacuum degassing furnace, and wearing speeds were measured in mm/charge.

TABLE 1

Chemical Composition and Characteristics of Refractory Materials (percent by weight)

| | $Al_2O_3$ | MgO | CaO | $SiO_2$ | $NaO_2$ | $ZrO_2$ | $P_2O_5$ | $B_2O_3$ | Others | Characteristics |
|---|---|---|---|---|---|---|---|---|---|---|
| Light burned magnesia ① | 97.0 | 0.6 | | | | | | | | Iodine absorption 27 mg I/g |
| Light burned magnesia ② | 96.8 | 0.7 | | | | | | | | Iodine absorption 15 mg I/g |
| Microfine calcined alumina ① | 99.7 | | | 0.2 | | | | | | Average grain size 2.7 μm |
| Microfine calcined alumina ② | 99.7 | | | 0.2 | | | | | | Average grain size 0.6 μm |
| Fused alumina | 99.6 | | | 0.2 | | | | | | |
| Sintered alumina | 99.6 | | | 0.2 | | | | | | |
| Fused spinel | 71.0 | 28.0 | 0.4 | 0.2 | | | | | | |
| Sintered spinel ① | 95.3 | 4.3 | 0.1 | 0.2 | | | | | | |
| Sintered spinel ② | 89.0 | 10.5 | 0.1 | 0.2 | | | | | | |
| Sintered magnesia | | 98.0 | 1.0 | | | | | | | Grain size 0.15 mm max. |
| Sodium phosphate glass | 7 | | | 2 | 21 | | 65 | | 5 | Melting temperature 425° C. |
| Boric silicate glass | 2.7 | | 12.5 | 32.8 | 32.8 | | | 27.3 | 4.5 | Melting temperature 510° C. |
| Alumina cement | 80 | | 18 | | | | | | | |
| Silica fume | | | | 94.0 | | | | | | |
| Zirconia | | 2.7 | | | | 96.0 | | | | Grain size 44 μm max., 20 μm ave. |
| Carbon powder (Needle cokes) | | | | | | | | | | Fixed carbon 99.3 wt %, Grain size 1.0 mm max. |

TABLE 2

Examples of Present Invention and Conventional Products

| | Present Invention | | | | | | | | Conventional Products for Comparison | | |
|---|---|---|---|---|---|---|---|---|---|---|---|
| | 1 | 2 | 3 | 4 | 5 | 6 | 7 | 8 | 1 | 2 | 3 |
| Components of refractories (percent by weight) | | | | | | | | | | | |
| Fused spinel, 3–5 mm | 25 | 25 | 25 | | | | | | 25 | | 25 |
| Fused spinel, 1–3 mm | 25 | 25 | 25 | | | | | | 25 | | 25 |
| Fused spinel, 1 mm max. | 13 | 13 | | | 10 | 13 | 10 | 10 | 13 | | |
| Fused spinel, 0.15 mm max. | 10 | | | 10 | 10 | 5 | 10 | 10 | 10 | | |
| Fused spinel, 0.044 mm max. | 5 | | | 10 | | | | | 25 | | |
| Fused alumina, 3–5 mm | | | | 25 | 25 | 25 | 25 | 25 | | 25 | |
| Fused alumina, 1–3 mm | | | | 25 | 25 | 25 | 25 | 25 | | 25 | |
| Fused alumina, 1 mm max. | | | 13 | 13 | 3 | | 3 | 3 | | 13 | 15 |
| Fused alumina, 0.15 mm max. | | 10 | 10 | | | | | | | 10 | 10 |
| Fused alumina, 0.044 mm max. | | 10 | 15 | 10 | | | | | | 25 | 15 |
| Microfine calcined alumina ① | 20 | 15 | 10 | 5 | 25 | 30 | 26.5 | 19 | | | |
| Light burned magnesia ① | 2 | 2 | 2 | | | | | | 2 | 2 | |
| Light burned magnesia ② | | | | 2 | 2 | 2 | 0.5 | 8 | | | |
| Alumina Cement | | | | | | | | | | | 10 |
| Dispersing agents (percent by weight of refractories) | | | | | | | | | | | |
| Sodium hexametaphosphate | (0.1) | (0.1) | (0.1) | (0.1) | (0.1) | (0.1) | (0.1) | (0.1) | (0.1) | (0.1) | |
| Sodium polyacrylate | | | | | | | | | | | (0.1) |
| Water added (percent by weight of refractories) | (5.2) | (5.3) | (5.5) | (5.8) | (5.3) | (5.5) | (5.0) | (6.5) | (7.0) | (7.0) | (6.5) |
| Tests | | | | | | | | | | | |

TABLE 2-continued

| | Examples of Present Invention and Conventional Products | | | | | | | | | | |
|---|---|---|---|---|---|---|---|---|---|---|---|
| | Present Invention | | | | | | | | Conventional Products for Comparison | | |
| | 1 | 2 | 3 | 4 | 5 | 6 | 7 | 8 | 1 | 2 | 3 |
| Modulus of rupture (kg/cm$^2$) (after drying) | 120 | 110 | 100 | 90 | 130 | 135 | 90 | 150 | 55 | 50 | 120 |
| Spalling resistance (Cycle time till peeling) | 30+ | 30+ | 30+ | 30+ | 30+ | 30+ | 30+ | 30+ | 20 | 25 | 15 |
| Erosion (mm) | 4.5 | 4.0 | 4.5 | 5.5 | 4.5 | 5.0 | 5.5 | 5.5 | 8.0 | 7.5 | 9.0 |
| Slag Penetration (mm) | 3.0 | 2.0 | 2.0 | 3.5 | 1.5 | 2.0 | 2.5 | 3.0 | 5.0 | 4.5 | 6.0 |
| Erosion in actual service (mm/ch) | | | 0.5 | | | | | | | | 2.0 |

TABLE 3

| | Examples of Present Invention and Conventional Products | | | | | | | |
|---|---|---|---|---|---|---|---|---|
| | Present Invention | | | | | Conventional Products for Comparison | | |
| | 9 | 10 | 11 | 12 | 13 | 4 | 5 | 6 |
| Components of refractories (percent by weight) | | | | | | | | |
| Sintered spinel ①, 3-5 mm | 25 | | | | | | | |
| Sintered spinel ①, 1-3 mm | 25 | | 25 | | | | | |
| Sintered spinel ②, 3-5 mm | | 25 | 25 | | | | 25 | |
| Sintered spinel ②, 1-3 mm | | 25 | | | | | 25 | |
| Sintered spinel ②, 1 mm max. | | 13 | | 15 | | | | |
| Sintered alumina, 3-5 mm | | | | 25 | 25 | 25 | | 25 |
| Sintered alumina, 1-3 mm | | | | 25 | 25 | 25 | | 25 |
| Sintered alumina, 1 mm max. | 13 | | 13 | | 13 | 15 | 15 | 15 |
| Sintered alumina, 0.15 mm max. | 10 | 10 | 10 | 10 | 10 | 10 | 10 | 10 |
| Sintered alumina, 0.044 mm max. | 10 | 10 | 10 | 5 | 5 | 5 | 5 | 5 |
| Sintered magnesia | | | | | | 3 | 6 | |
| Microfine calcined alumina ② | 15 | 15.5 | 14 | 19 | 20.5 | | | 19.9 |
| Light burned magnesia ② | 2 | 1.5 | 3 | 1 | 1.5 | | | 0.1 |
| Silica fume | | | | | | 2 | | |
| Alumina Cement | | | | | | 5 | 10 | |
| Additives (percent by weight of refractories) | | | | | | | | |
| Azodicarbonamide | | (0.2) | | | (0.1) | | | |
| 4.4 oxybisbenzensulfonylhydrazide | | | | (0.2) | | | | |
| Sodium phosphate glass | | | | (1.0) | (2.0) | | | |
| Dispersing agents (percent by weight of refractories) | | | | | | | | |
| Sodium hexametaphosphate | (0.1) | (0.1) | (0.1) | (0.1) | (0.1) | | | (0.1) |
| Sodium polyacrylate | | | | | | (0.1) | (0.1) | |
| Water added (percent by weight of refractories) | (5.4) | (5.3) | (5.6) | (5.2) | (5.3) | (5.5) | (6.0) | (5.1) |
| Tests | | | | | | | | |
| Modulus of rupture (kg/cm$^2$) (after drying) | 120 | 150 | 160 | 180 | 200 | 150 | 200 | 100 |
| Modulus of rupture (kg/cm$^2$) (at 800° C. firing) | 60 | 70 | 80 | 120 | 140 | 100 | 120 | 70 |
| Permanent Linear Change (%) (1500 × 3 hours) | +0.02 | +0.00 | +0.01 | −0.02 | −0.10 | +1.20 | +1.65 | |
| Spalling resistance (Cycle time till peeling) | 30+ | 30+ | 30+ | 30+ | 30+ | 15 | 20 | 25 |
| Erosion (mm) | 5.0 | 5.0 | 5.5 | 5.3 | 6.0 | 8.5 | 9.0 | 8.5 |
| Slag Penetration (mm) | 3.0 | 2.0 | 2.0 | 1.5 | 1.5 | 2.0 | 5.0 | 3.5 |
| Erosion in actual service (mm/ch) | | | | 0.6 | | | | |

| | Conventional Products for Comparison | | |
|---|---|---|---|
| | 7 | 8 | 9 | 10 |
| Components of refractories (percent by weight) | | | | |
| Sintered spinel ①, 3-5 mm | | | | Magnesia Cromite Direct Bonded Brick |
| Sintered spinel ①, 1-3 mm | | | | |
| Sintered spinel ②, 3-5 mm | | | 25 | 25 |
| Sintered spinel ②, 1-3 mm | | | 25 | 15 |
| Sintered spinel ②, 1 mm max. | | 25 | | |
| Sintered alumina, 3-5 mm | 25 | | | |
| Sintered alumina, 1-3 mm | 25 | | | |
| Sintered alumina, 1 mm max. | 15 | 15 | 10 | |
| Sintered alumina, 0.15 mm max. | 10 | 10 | 5 | |
| Sintered alumina, 0.044 mm max. | 5 | 22 | 3 | |
| Sintered magnesia | | | | |
| Microfine calcined alumina ② | 5 | 1 | 40 | |
| Light burned magnesia ② | 15 | 2 | 2 | |
| Silica fume | | | | |
| Alumina Cement | | | | |
| Additives (percent by weight of refractories) | | | | |

TABLE 3-continued

| Examples of Present Invention and Conventional Products | | | | |
|---|---|---|---|---|
| Azodicarbonamide | | | | |
| 4.4 oxybisbenzensulfonylhydrazide | | | | |
| Sodium phosphate glass | | | | |
| Dispersing agents (percent by weight of refractories) | | | | |
| Sodium hexametaphosphate | (0.1) | (0.1) | (0.1) | |
| Sodium polyacrylate | | | | |
| Water added (percent by weight of refractories) | (6.5) | (7.0) | (8.0) | |
| Tests | | | | |
| Modulus of rupture (kg/cm$^2$) (after drying) | 100 | 120 | 150 | |
| Modulus of rupture (kg/cm$^2$) (at 800° C. firing) | 60 | 60 | 50 | |
| Permanent Linear Change (%) (1500 × 3 hours) | | | | |
| Spalling resistance (Cycle time till peeling) | 20 | 15 | 10 | 10 |
| Erosion (mm) | 9.0 | 9.5 | 10.0 | 3.5 |
| Slag Penetration (mm) | 6.0 | 1.5 | 3.5 | 15.5 |
| Erosion in actual service (mm/ch) | | | | 0.7 |

TABLE 4

| Examples of Present Invention | | |
|---|---|---|
| | Present Invention | |
| | 14 | 15 |
| Components of refractories (percent by weight) | | |
| Fused spinel, 3-5 mm | 20 | |
| Fused spinel, 1-3 mm | 25 | |
| Fused spinel, 1 mm max. | | 13 |
| Fused spinel, 0.15 mm | | 20 |
| Fused alumina, 3-5 mm | | 20 |
| Fused alumina, 1-3 mm | | 25 |
| Fused alumina, 1 mm max. | 13 | |
| Sintered alumina, 0.15 mm max. | 10 | |
| Sintered alumina, 0.044 mm max. | 10 | |
| Microfine calcined alumina ① | 15 | 15 |
| Zirconia | 5 | |
| Carbon powder (Needle cokes) | | 5 |
| Light burned magnesia ② | 2 | 2 |
| Additives (percent by weight of refractories) | | |
| Azodicarbonamide | (0.2) | (0.1) |
| Sodium phosphate glass | | (2.0) |
| Dispersing agents (percent by weight of refractories) | | |
| Sodium hexametaphosphate | (0.1) | |
| Sodium polyacrylate | | (0.1) |
| Water added (percent by weight of refractories) | (5.4) | (5.3) |
| Tests | | |
| Modulus of rupture (kg/cm$^2$) (after drying) | 110 | 160 |
| Modulus of rupture (kg/cm$^2$) (at 800° C. firing) | 70 | 130 |
| Spalling resistance (Cycle time till peeling) | 30+ | 30+ |
| Erosion (mm) | 4.5 | 5.0 |
| Slag Penetration (mm) | 2.0 | 1.0 |
| Erosion in actual service (mm/ch) | 0.5 | |

The embodiment of the present invention showed good results in all of these tests. The actual service test brought almost the same result as that of burned magnesia-chrome brick.

On the other hand, in the reference examples 1 and 2, micro fine calcined alumina was not used and these specimens were inferior in erosion resistance and slag penetration proofing. The material of reference example 3 is the same as the conventional one which uses alumina cement as binder. The modulus of rupture was large, but the erosion resistance was inferior, because the specimen reacted quickly to slag. Also, CaO present in the alumina cement caused excessive sintering, resulting in lower spalling resistance.

Reference examples 4 and 5 used sintered magnesia, which is larger than light burned magnesia in crystal grain diameter. Thus, cubic expansion became large when spinel was generated by reacting with micro fine calcined alumina, and the permanent linear changes were large, resulting in inferior erosion resistance and slag penetration proofing. Also, CaO present in the alumina cement caused excessive sintering, resulting in lower spalling resistance.

Since the amount of light burned magnesia in reference example 6 is small, the strength and erosion resistance of the object to be constructed are inferior.

Since the amount of light burned magnesia in reference example 7 is large, a large amount of water is necessary for casting, leading to inferior strength of the object to be constructed. Also, the large amount of light burned magnesia leads to inferior spalling resistance.

Both reference example 8 in which the amount of micro fine calcined alumina is small, and reference example 9 in which the amount is large, require a large amount of water when casting, leading to inferior erosion resistance.

The material in reference example 10 was magnesia-chromite direct bonded brick which was far superior in erosion resistance but was inferior in slag penetration proofing and spalling resistance. The actual service test indicates that example 10 was less durable than the embodiment of the present invention.

What is claimed is:

1. Refractory for casting process mainly composed of 0.3 to 10 wt % light burned magnesia obtained by burning magnesium hydroxide at a temperature below 1300° C., 3 to 30 wt % micro fine calcined alumina having an average granular size below 8 μm, and the remainder of either sintered alumina, fused alumina and MgO-Al$_2$O$_3$ spinel or sintered alumina and MgO-Al$_2$O$_3$ spinel or fused alumina and MgO-Al$_2$O$_3$ spinel.

2. The refractory for casting process of claim 1, wherein said light burned magnesia has an iodine absorption activity of 1 to 50 mg/g.

3. The refractories for casting process of claims 1 or 2, wherein glass powder having a melting point of 1000° C. or less is added by 3 wt % or less of the total refractory to said refractories for casting process.

4. The refractories for casting process of claims 1 or 2, wherein at least either of azodicarbonamide or 4,4-oxybisbenzesulfonylhydrazide is added by 2 wt % or less of the total refractory to said refractories for casting process.

5. The refractories for casting process of claim 3, wherein at least either of azodicarbonamide or 4,4-oxybisbenzen-sulfonylhydrazide is added by 2 wt % or less of the total refractory to said refractories for casting process.

* * * * *